United States Patent [19]

Kweon et al.

[11] Patent Number: 5,415,833
[45] Date of Patent: May 16, 1995

[54] METHOD FOR FORMING MOLTEN CARBONATE FUEL CELL ANODES

[75] Inventors: Ho-jin Kweon; Hai-soo Chun, both of Seoul; Ha-chull Chung, Chunan; Je-hong Youn; Gwun-pil Park, both of Seoul, all of Rep. of Korea

[73] Assignee: Samsung Electronics Co., Ltd., Kyungki-do, Rep. of Korea

[21] Appl. No.: 220,640

[22] Filed: Mar. 31, 1994

[30] Foreign Application Priority Data

Sep. 16, 1993 [KR] Rep. of Korea ............ 93-18664
Oct. 29, 1993 [KR] Rep. of Korea ............ 93-22736

[51] Int. Cl.$^6$ ............................................. B22F 7/02
[52] U.S. Cl. ............................................. 419/58; 419/5; 419/8; 419/9; 419/10; 419/36; 419/40; 419/53; 419/54
[58] Field of Search ............ 419/2, 5, 8, 9, 10, 419/36, 40, 53, 54, 58; 428/548, 552; 252/512

[56] References Cited

U.S. PATENT DOCUMENTS

| | | | |
|---|---|---|---|
| 4,315,777 | 2/1982 | Nadkarni et al. | 75/232 |
| 4,664,883 | 5/1987 | Melody et al. | 419/2 |
| 4,714,586 | 12/1987 | Swarr et al. | 419/2 |
| 4,999,155 | 3/1991 | Ong et al. | 419/2 |
| 5,110,541 | 5/1992 | Yamamasu et al. | 419/2 |
| 5,312,580 | 5/1994 | Erickson et al. | 419/2 |

*Primary Examiner*—Donald P. Walsh
*Assistant Examiner*—John N. Greaves
*Attorney, Agent, or Firm*—Sughrue, Mion, Zinn, Macpeak & Seas

[57] ABSTRACT

A method for forming molten carbonate fuel cell (MCFC) anodes by adjusting the reaction condition of pack cementation is disclosed. The method includes the steps of embedding a base metal sheet containing at least Ni in a pack containing alloy metal powder, an activator and a filler, pre-heating the pack to remove the organic material included in the base metal sheet, and maintaining the pack under a $H_2/N_2$ atmosphere at a temperature of 500° C. to 800° C. for one to eight hours to form a Ni alloy. The method has a simplified procedure and is very useful to manufacture MCFC anodes having a very low creep deformation rate while porosity is in an appropriate range.

2 Claims, 7 Drawing Sheets

METHOD FOR FORMING MOLTEN CARBONATE FUEL CELL ANODES

FIELD OF THE INVENTION

The present invention relates to a method for forming a molten carbonate fuel cell (MCFC) anode, and more particularly, to a method for adding aluminum (Al) or aluminum and chromium (Al+Cr) by means of a pack cementation procedure to improve the creep resistance of a nickel (Ni) electrode used as the MCFC anode.

BACKGROUND OF THE INVENTION

A fuel cell, which is a new generation system using electrical energy directly converted from the energy produced by the electrochemical reaction of a fuel gas and an oxidant gas, is under careful examination for use as power generation equipment, such as that for space stations, unmanned facilities at sea or along coastal areas, fixed or mobile radios, automobiles, household electrical appliances or portable electrical appliances.

Fuel cells are divided into a molten carbonate electrolyte fuel cell operated at a high temperature (in the range from about 500° C. to about 700° C.), a phosphoric acid electrolyte fuel cell operated around 200° C., an alkaline electrolyte fuel cell operated at a room temperature to about 100° C., and a solid electrolyte fuel cell operated at a very high temperature (1,000° C. or above).

A molten carbonate fuel cell (MCFC) is constituted by a porous Ni anode, Li-doped porous Ni oxide cathode and lithium aluminate matrix which is filled with lithium and potassium carbonate as electrolytes. The electrolytes are ionized by melting at about 500° C. to 700° C., which is the operating temperature of the cell, and the carbonate ions generated therefrom transport charges between the electrodes. Hydrogen is consumed in the anode area producing water, carbon dioxide and electrons. The electrons flow to the cathode via an external circuit to produce the desired current flow.

Porous anodes of nickel, cobalt or copper base are typically used in MCFCs. As mentioned above, MCFCs are operated at a high temperature of about 650° C., and pressure is also applied thereon in order to improve the contact between electrodes and an electrolyte matrix. Various layers are stacked to produce pressure by the loading of the stack, so that a creep deformation which deforms the structure of the anode occurs. Creep deformation of electrodes occurs by a combination of at least the three different mechanisms of particle rearrangement, sintering and dislocation movement. Due to non-uniform creeps of the respective parts of the anode, the minute pores are reduced, thereby reducing the reactive area of the electrode, creating a poor contact between electrodes and electrolyte elements and leading to the possibility of fuel gas leakage, so that electrode performance is lowered in various respects.

Therefore, various methods has been attempted to prevent such an undesirable creep deformation in MCFC anodes. One method is to manufacture the anode by adding Cr or Al to Ni. For example, when a creep test is performed for 100 hours at the conditions of 100 psi and 650° C., the pure Ni electrode has about 30% to 50% creep. Ni—LiAlO$_2$, which is made by adding LiAlO$_2$ to Ni electrode, has about 14% to 35% creep. Likewise, in the case of Ni—Cr (10%) to which 10% Cr is added and Ni—Al (10%) to which 10% Al is added, the creeps are lowered to 5% to 10% and to about 2%, respectively. In operating MCFCs of a large capacity, however, a satisfactory performance for a long time (40,000 hours) has not yet been achieved.

Although Ni—Cr (10%) anodes have been widely used so far, since the price of Cr is high, the addition of Al is considered. If Al is added to Ni, the creep deformation is lowered to 2% or less. Besides, Al is cheaper than Cr.

A Ni—Al anode or Ni—(Al,Cr) anode made by adding Al or Cr to Ni is manufactured by the same procedure as that used in the art by forming a green sheet by a casting method after forming an alloy powder of Ni and additive metals. However, it is difficult to form a minute alloy powder of Ni and metals.

One method for preventing creep deformation of a porous anode structure is to internally oxidize alloy metals typically used in the base metal-alloy metal composition.

For example, U.S. Pat. No. 4,315,777 discloses a method for internally oxidizing alloy metal by a heat treatment of the powder blend of an alloy powder and an oxidant base metal, but it is not suitable for use as a porous anode structure because of the high density of the end product.

U.S. Pat. No. 4,714,586, which discloses a method for forming dimensionally stable Ni—Cr anodes by internally oxidizing the alloy metal at high water vapor pressures, is limited to the formation of Ni—Cr anodes.

U.S. Pat. No. 3,578,443 discloses a method for producing an oxide dispersion strengthened alloy and then sintering by surface oxidizing Cu, Al powder by contact with an alcohol suspension and internally oxidizing all the powder by heat treatment in an airtight tube at 750° C. The material produced by this method is not suitable as a porous anode structure because of its high density.

To solve the aforementioned problems, U.S. Pat. No. 4,999,155 discloses a method for forming MCFC anodes with an improved creep resistance property. That is to say, a base metal powder and alloy metal powder are blended with a binder and solvent, then the blend is dried, sintered, and cast to form a porous anode structure. The alloy metal is internally oxidized under conditions in which the base metal is reduced and the alloy metal is oxidized to form oxide particles therein.

Another method disclosed in the above patent is forming an alloy including a base metal and an alloy metal, oxidizing the surface of the alloy by a heat treatment, and then simultaneously sintering and internally oxidizing the oxidized alloy. Here, the introduction of the alloy metal to the base metal is achieved by tape casting and sintering the mixture of the base metal powder and the alloy metal powder and then diffusing the alloy metal to the base metal. Alternatively, a vapor deposition or a pack cementation is performed after the base metal powder is tape cast and sintered into a porous structure.

According to the above method, Ni metal powder is first mixed with binder and solvent, then tape cast, dried and sintered to form a porous Ni sintered body. Then, the porous nickel sintered body is embedded in a pack consisting of alloy metal powder such as Al, an activator salt and an inert filler, and is heated to about 900° C. in an atmosphere of 10%-H$_2$/90%-N$_2$, performing a pack cementation and thereby forming Ni—Al alloy. Next, the structure is then internally oxidized at temperatures of 600° C. to 800° C. in a humidified atmosphere having a pH$_2$0/pH$_2$ ratio greater than 20. Although the method has an excellent effect in decreasing creep deformation, since various complicated procedures such as drying, sintering, pack cementation and internal oxidization should be performed after forming a green sheet with a Ni base metal, this method lacks utility.

SUMMARY OF THE INVENTION

In consideration of various problems as mentioned above, in order to decrease creep deformation of a MCFC anode, it is an object of the present invention to provide a method for forming a MCFC anode which is performed in one procedure while only the conditions of atmosphere and temperature for a pack cementation are changed, thereby improving a complicated and prolonged conventional procedure.

To accomplish the above object, the method for forming MCFC anodes according to the present invention comprises the steps of: embedding a base metal sheet comprising at least Ni in a pack comprising alloy metal powder, an activator and a filler; pre-heating the pack to remove any organic material included in the base metal sheet; and maintaining the pack under a $H_2/N_2$ atmosphere at a temperature of 500° C. to 800° C. for one to eight hours to form a Ni alloy.

In particular, it is desirable for the base metal sheet comprising at least Ni to be a green sheet formed from a slurry including Ni powder, a binder and a solvent. Also, the pre-heating is desirably maintained under an oxygen atmosphere at a temperature of 300° C. to 500° C. for two to five hours.

At least one metal selected from the group consisting of Al and Cr is preferably employed as the alloy metal which is added to a Ni base metal in the present invention. Particularly, the amount of alloy metal in the Ni alloy produced by the method according to the present invention is preferably in the range of 2 to 12% by weight and is most preferably in the range of 5 to 12% by weight.

BRIEF DESCRIPTION OF THE DRAWINGS

The above objects and other advantages of the present invention will become more apparent by describing in detail preferred embodiments thereof with reference to the attached drawings in which:

FIG.3A shows the surface and FIG.3B shows a section thereof;

DETAILED DESCRIPTION OF THE INVENTION

The manufacturing method according to the present invention is to form an alloy which is composed of a Ni base metal and an additive metal by means of a pack cementation, and the method is performed in a simple manner that only the conditions of atmosphere and temperature are changed while a Ni green sheet is embedded in a pack comprising one or two additive metal powders.

Figure 1B:
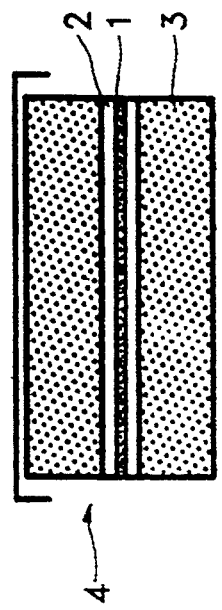
FIG. 1 is a schematic diagram of the pack cementation procedure for manufacturing the Ni alloy anode according to the present invention.
Figure 1A:
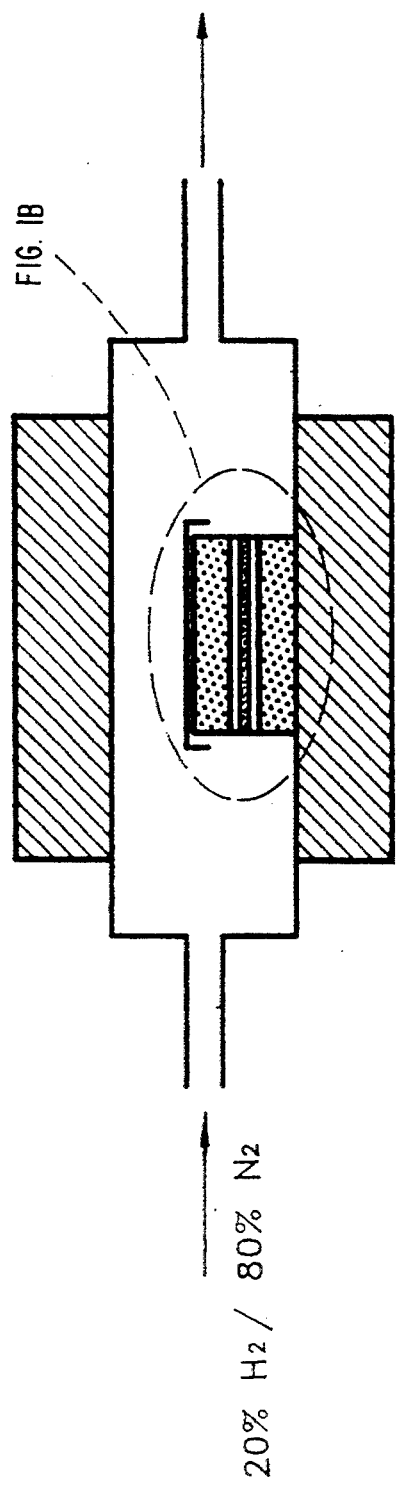

FIG. 1 is a schematic diagram of the pack cementation procedure for manufacturing the Ni alloy anode according to the present invention. Hereinbelow, referring to FIG. 1, the manufacturing method according to the present invention will be described in detail.

First, Ni powder, a suitable binder, a plasticizer, etc., are mixed in a proper ratio and suspended in a solvent to form a slurry. Then, a Ni green sheet 1 is formed using a doctor blade.

Alloy metal powder such as Al or Cr to be added to a Ni base metal is mixed with $Al_2O_3$, an inert filler, and an activator, to form a pack 3. As the activator, $NH_4Cl$, NaCl, NaF or NaI may be used. Among these, $NH_4Cl$ is preferably used when a pack cementation is performed at a low temperature(near 500° C.), and NaCl is preferably used at a high temperature (near 800° C.). The Ni green sheet 1 formed in the above process is placed in a porous alumina plate 2 and inserted in the middle of the pack 3. The pack 3 is then put in an alumina crucible 4.

The alumina crucible 4 is placed in an electric furnace, and the organic material, such as the binder used for forming the Ni green sheet 1, is burnt and removed by maintaining the pack 3 under an oxygen atmosphere at a temperature of 300° C. to 500° C. for two to five hours.

Subsequently, pack cementation is performed by elevating the temperature to 500° C. to 800° C. in a $H_2 N_2$ atmosphere and maintaining the temperature for one to eight hours and thereby forming a MCFC anode which alloys an additive metal such as Al, Cr, etc. to a Ni base metal. At this time, the alloy metal such as Al, Cr, etc. is reacted with NaCl in the pack 3 to be converted to a gaseous halogen compound and reacted again with Ni to form an intermetallic compound such as Ni—Al, Ni—(Al,Cr), etc.

In a Ni alloy produced by the method according to the present invention, the amount of the alloy metal added is related to the temperature and time on the pack cementation process. Under the conditions of the $H_2/N_2$ atmosphere and the temperature of 500° C. to 800° C. for one to eight hours, the alloy metal in the Ni alloy may be added in a preferable amount of 2–12% by weight, and in the most preferable amount of 5–12% by weight.

Hereinbelow, the present invention will be described in more detail through specific embodiments. However, the following embodiments are only illustrative examples and are not intended to limit the present invention hereby. Unless otherwise indicated, all parts, percents, ratios and the like are by weight.

EXAMPLE 1

Formation of a Ni—Al anode

Inco 255 Ni powder (average particle size: 3 μm), polyvinyl butyral and dibutyl phthalate were mixed in a proper ratio and suspended in toluene/ethanol to form a slurry. Then, a Ni green sheet was formed using a doctor blade unit. Separately, Al powder (ALCOA, average particle size: 6– 9 μm) was mixed with $Al_2O_3$ (ALCOA, average particle size: 5 μm) and NaCl (SHINYO, 99.9% pure) to form a pack. Then, the Ni green sheet formed from the above process was placed in a porous alumina plate and inserted in the middle of the pack. The pack was then put in an alumina crucible.

The alumina crucible was placed in an electric furnace, and the pack was maintained under an oxygen atmosphere at a temperature of 300° C. to 500° C. for two to five hours.

Subsequently, pack cementation was performed by elevating the temperature to 500° C. to 800° C. in a 20% $H_2$/80% $N_2$ atmosphere and maintaining the temperature for one to eight hours and thereby forming a Ni—Al alloy to manufacture a MCFC anode.

EXAMPLE 2

Formation of a Ni—(Al,Cr) anode

This example was performed in the same manner as Example 1 except that a MCFC anode was manufactured by mixing a blend of Al and Cr powder with $Al_2O_3$ and NaCl to form a pack and thereby form a Ni—(Al,Cr) alloy. According to this Example, Al and Cr were added in the Ni alloy in the amount of 6.2 %.

Figure 2A:
FIGS. 2A and 2B are scanning electron microscope (SEM) pictures taken before and after the pack cementation is performed in the Ni—(Al,Cr) anode manufactured by one embodiment according to the present invention.
Figure 2B:

FIGS. 2A and 2B are scanning electron microscope (SEM) pictures taken before and after the pack cementation was performed in the Ni—(Al,Cr) anode manufactured by one embodiment according to the present invention, respectively. Comparing the pictures, FIG.2B displays minute particles not shown in FIG. 2A stuck to Ni particles of the electrode. The result of analyzing the particles by means of an energy dispersive X-ray analysis (EDXA) is given in the following Table 1, showing the EDXA results for a Ni electrode to which Al and Cr are added.

TABLE 1

| composition | intensity (cts/sec) | 2-σ error (comparative value) |
|---|---|---|
| Al | 1,043.51 | 0.0038 |
| Ti | 10.10 | 0.0937 |
| V | 5.15 | 0.1310 |
| Cr | 259.27 | 0.0082 |
| Ni | 1,858.20 | 0.0025 |

Figure 3A:
FIGS. 3A and 3B are scanning electron microscope (SEM) pictures of the Ni—Al anode manufactured by another embodiment according to the present invention, where
Figure 3B:

As shown in the above Table 1, in the case of the Ni—(Al,Cr) anode manufactured so as to include 6.2% of Al and Cr according to the present invention, Al and Cr were deposited at a ratio of about 4:1. FIGS. 3A and 3B are scanning electron microscope (SEM) pictures of the Ni—Al anode manufactured by another embodiment according to the present invention, where FIG.3A shows the surface and FIG.3B shows a section thereof. These also display new small particles to be stuck to Ni particles, which means that Al is added, too.

Figure 4:
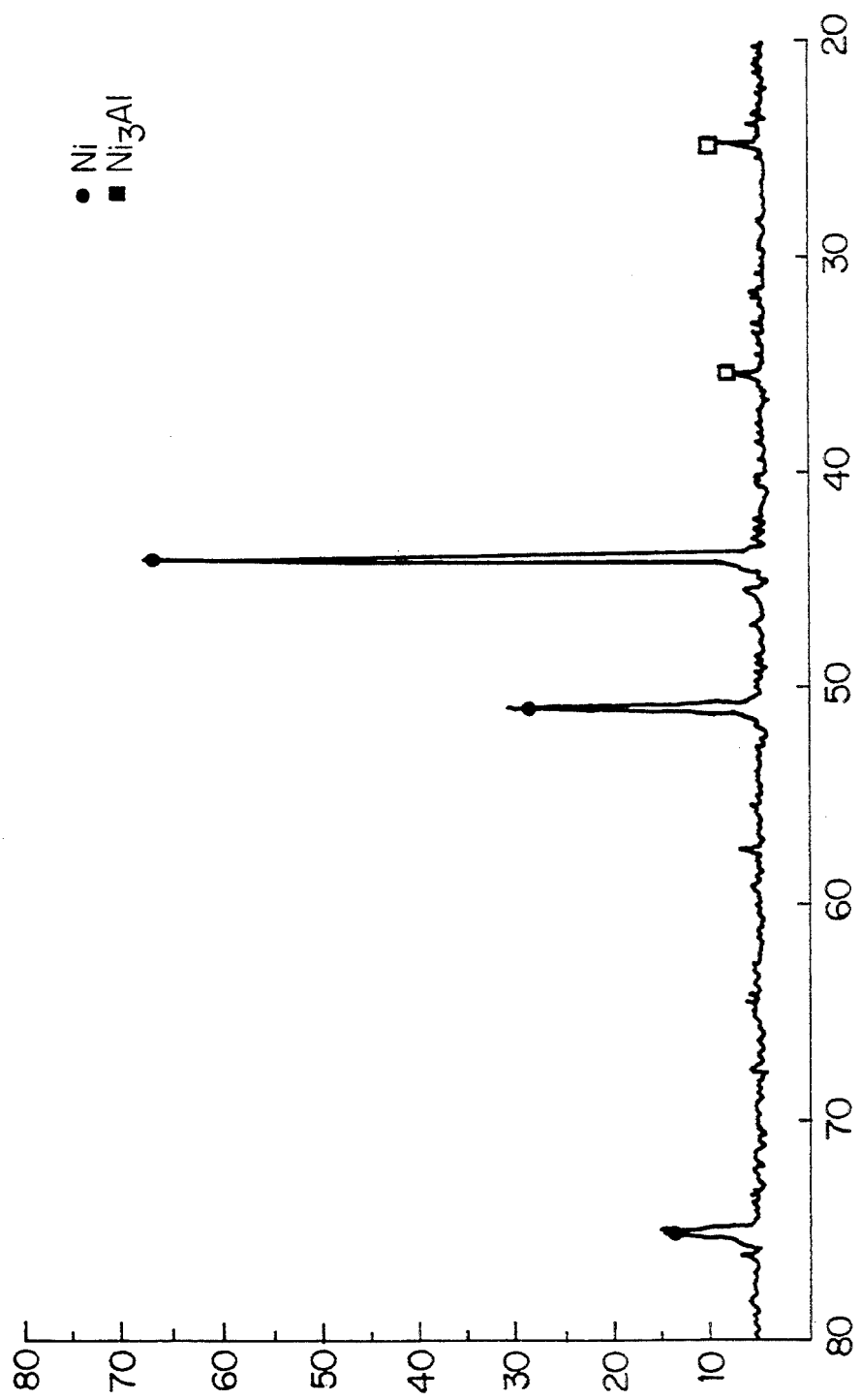
FIG. 4 is an X-ray diffraction analysis chart for the Ni—Al anode to which the pack cementation is performed by an embodiment of the present invention.

FIG. 4 is an X-ray diffraction analysis chart for the Ni—Al anode to which the pack cementation was performed according to an embodiment of the present invention. As described above, as a result of the X-ray diffraction analysis for the Ni—Al anode manufactured by the present invention, it is understood that the Al added to the Ni is mainly in the state of an intermetallic compound, $Ni_3Al$.

Also, referring to FIGS. 2 and 3, thick necks are formed between Ni particles, which means that sintering was performed in the course of the pack cementation. Although the time for the pack cementation of the present invention is generally longer than that for a conventional Ni-anode, the sintering is not performed excessively. Such a result shows that it is more difficult to perform the sintering of the intermetallic compound formed in the reaction process than that of Ni.

Figure 5:
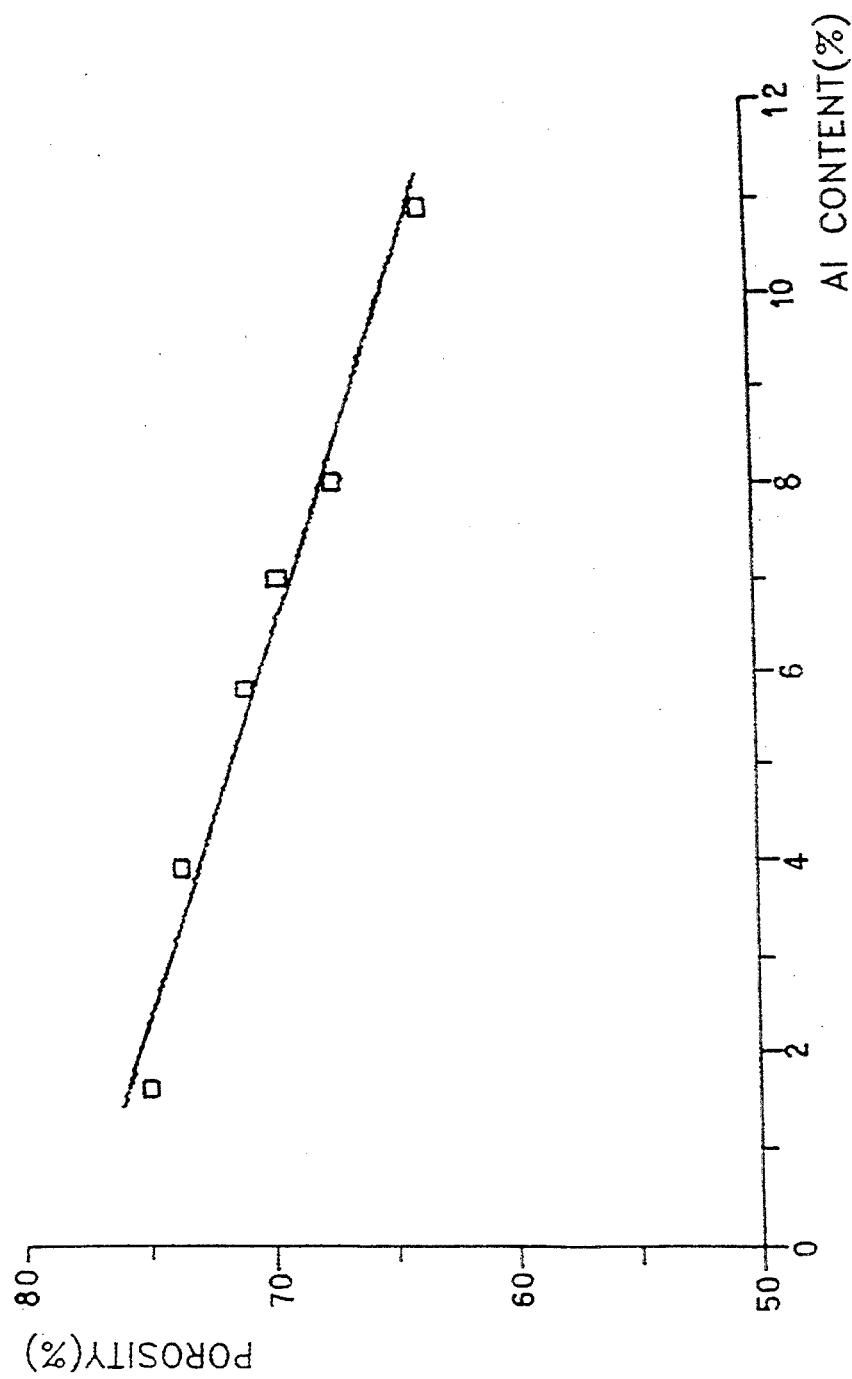
FIG. 5 is a graph showing the porosity (%) according to the Al content of the Ni—Al anode manufactured by an embodiment of the present invention.

FIG. 5 is a graph showing the porosity (%) according to the Al content of the Ni—Al anode manufactured according to an embodiment of the present invention. As shown in FIG.5, in the case where 2–12% by weight of Al is included, the porosity is 63 to 74 %, which is suitable range for the use as the MCFC anode.

Figure 6:
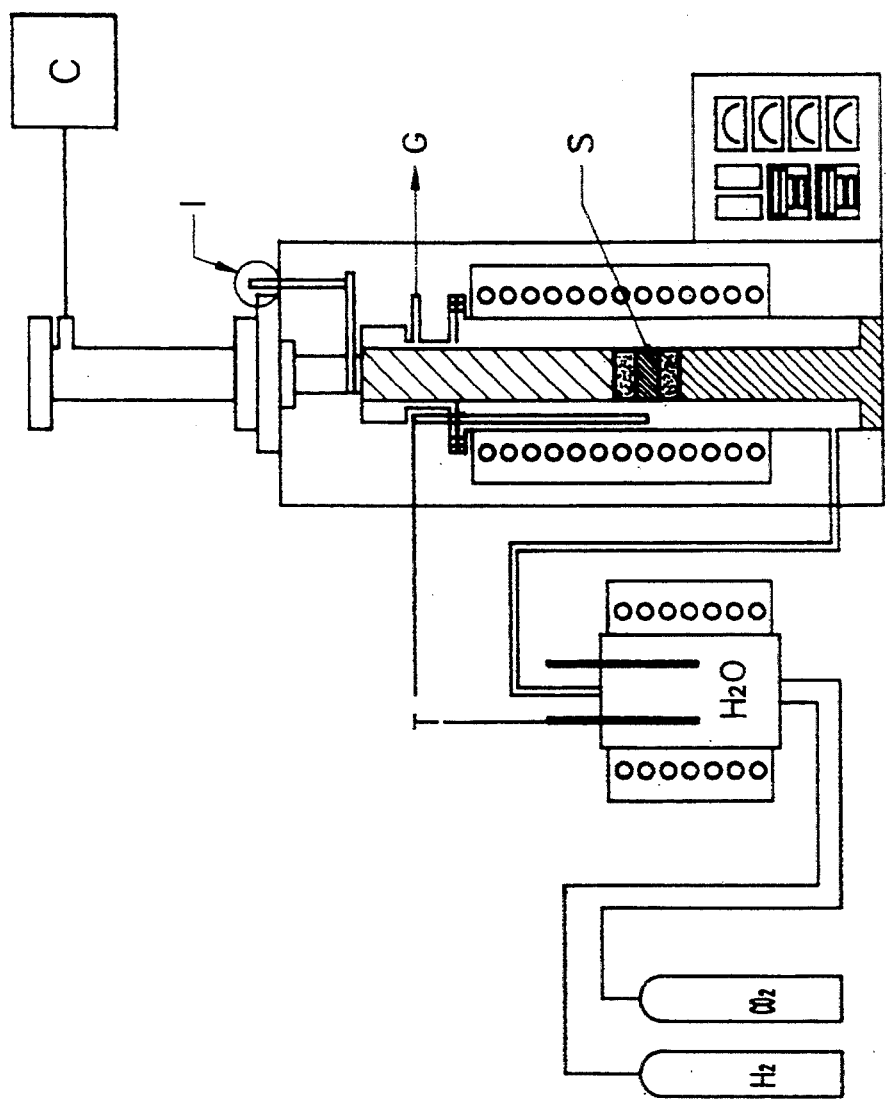
FIG. 6 is a schematic diagram of a creep test apparatus.

Next, the result of the creep test for the Ni—Al or Ni—(Al,Cr) anodes manufactured by the method according to the present invention using the apparatus shown in FIG.6 is described.

Referring to the creep test apparatus shown in FIG.6, reference letter S denotes an electrode sample, T denotes a thermocouple, I denotes a dial indicator, C denotes a compressor and G denotes a gas outlet. To make the same condition as with the MCFC operation, a pressure of 100psi was applied after the temperature was elevated to 650° C., the test was performed for 100 hours and then the results were compared.

Figure 7:
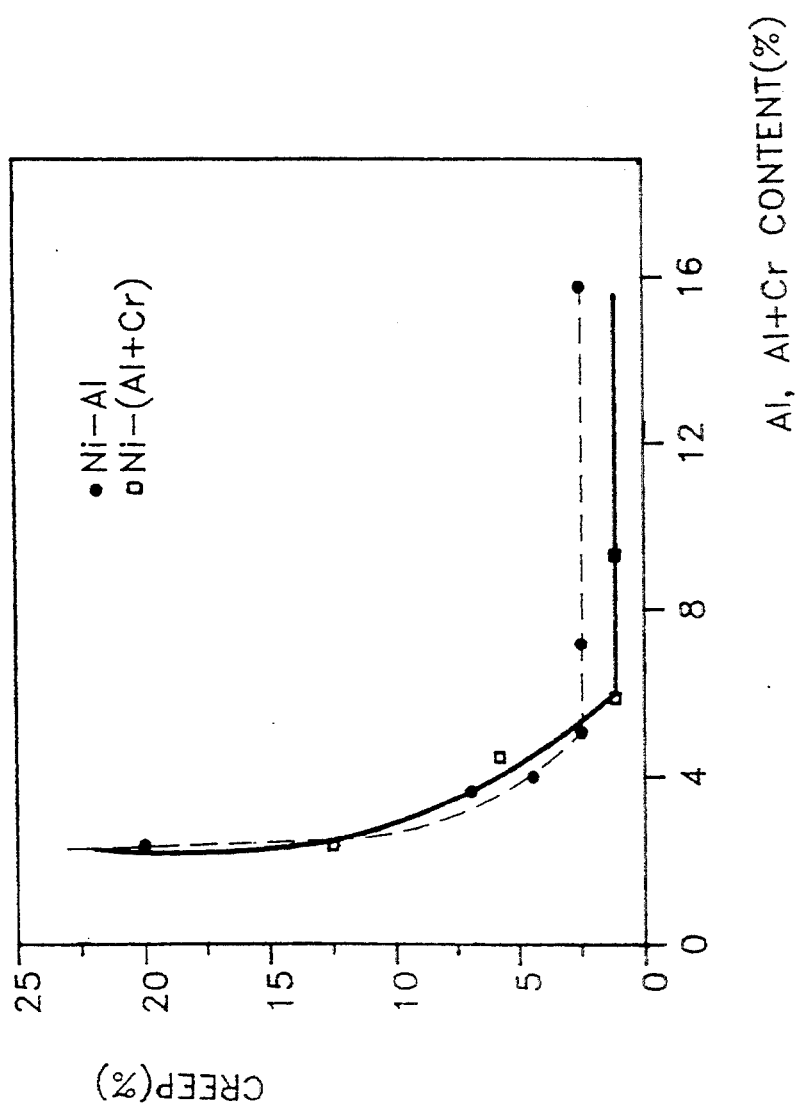
FIG. 7 is a graph showing the creep (%) according to the added amount of the alloy metals in the Ni—Al anode and Ni—(Al, Cr) anode manufactured by the method according to the present invention, where ●,● indicates the case of the Ni—Al anode and ☐—☐ indicates the case of the Ni— Al, Cr) anode.

FIG.7 is a graph showing the creep (%) according to the added amount of the alloy metals in the Ni—Al anode and Ni—(Al,Cr) anode manufactured by the method according to the present invention, where ●,● , the case of a Ni—Al anode and □—□ indicates the case of a Ni—(Al,Cr) anode. Here, it is understood that in the case where about 5% by weight of Al was included in the Ni alloy, the creep rate decreased to about 2% and that in the case where Al and Cr were simultaneously added, the creep rate decreased to a level lower than 2%.

Also, with the condition that the pressure was set at 200 psi and the others were the same as the above, the creep test was performed for the Ni—Al anode and the Ni—(Al,Cr) anode manufactured with the inclusion of respective 6% alloy metals, and the results are shown in Table 2.

TABLE 2

| Electrode sample | Creep rate(%) |
|---|---|
| Electrode to which 6% of Al + Cr is added | 7.5 |
| Electrode to which 6% of Al is added | 24.0 |

As shown in the above Table 2, the creep test under the more strengthened condition shows that the creep resistance of the electrode to which Al and Cr were simultaneously added was superior to the electrode to which Al was solely added.

As described above, the present invention is performed by one single procedure in which Ni green sheet is embedded in an alumina pack and only the conditions of atmosphere and temperature are changed, wherein a porous MCFC Ni-alloy anode is manufactured by pack cementation, and the creep deformation of the MCFC anode manufactured thereby is very low while its porosity is in an appropriate range(60–80% ), so that the manufacturing process becomes simplified and the cost is greatly reduced.

While the present invention has been particularly shown and described with reference to particular embodiments thereof, it will be understood by those skilled in the art that various changes in form and details may be effected therein without departing from the spirit and scope of the invention as defined by the appended claims.

What is claimed is:

1. A method for forming a molten carbonate fuel cell anode, consisting essentially of the steps of:

embedding a base metal sheet comprising at least Ni in a pack comprising alloy metal powder, an activator and a filler;

pre-heating the pack to remove any organic material included in the base metal sheet; and maintaining the pack under a $H_2/N_2$ atmosphere at a temperature of 500° C. to 800°C. for one to eight hours to form a Ni alloy;

wherein the alloy metal powder is a mixture of Al and Cr, with the amount of alloy metal in the Ni alloy being in the range of 2% to 12% by weight.

2. A method according to claim 1, wherein the mixture of Al and Cr contains Al and Cr at an Al:Cr weight ratio of 4:1.

* * * * *